United States Patent
Varesio et al.

(10) Patent No.: US 12,278,673 B2
(45) Date of Patent: Apr. 15, 2025

(54) APPARATUS AND METHODS FOR MESH COMMUNICATION NETWORKS WITH BROADCAST MESSAGES

(71) Applicant: STMicroelectronics S.r.l., Agrate Brianza (IT)

(72) Inventors: Matteo Varesio, Castellamonte (IT); Alessandro Lasciandare, Charvensod (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 491 days.

(21) Appl. No.: 17/527,805

(22) Filed: Nov. 16, 2021

(65) Prior Publication Data
US 2023/0155629 A1    May 18, 2023

(51) Int. Cl.
  *H04B 3/54*    (2006.01)
  *H04L 45/00*   (2022.01)
  (Continued)

(52) U.S. Cl.
  CPC ............ *H04B 3/54* (2013.01); *H04L 45/122* (2013.01); *H04L 45/20* (2013.01); *H04L 1/1621* (2013.01)

(58) Field of Classification Search
  CPC .. H04B 3/54; H04B 2203/5433; H04B 3/544; H04L 45/70; H04L 43/08; H04L 45/122; H04L 45/20; H04L 45/26; H04L 1/1621; H04L 45/00; H04L 12/189; H04L 45/16; H04W 40/02; H04W 40/246;
  (Continued)

(56) References Cited

U.S. PATENT DOCUMENTS 5,345,558 A * 9/1994 Opher ............... H04Q 11/0478
                                                    709/236
8,583,978 B2   11/2013 Shaffer et al.
(Continued)

FOREIGN PATENT DOCUMENTS

CN    113473427 A    10/2021
EP    2829116 B1     1/2019
(Continued)

OTHER PUBLICATIONS

Clausen et al., "RFC6206: The Trickle Algorithm", https://www.researchgate.net/publication/270394721, Mar. 2011, 14 pages.
(Continued)

*Primary Examiner* — Allahyar Kasraian
(74) *Attorney, Agent, or Firm* — Slater Matsil, LLP (57) ABSTRACT

An embodiment is a method including receiving, by a first device via a mesh communication network, a first broadcast message over a first communication channel, the first broadcast message having a first hop count, receiving, by the first device via the mesh communication network, a second broadcast message over the first communication channel, and determining, by the first device, whether the second broadcast message is a consistent broadcast message as the first broadcast message, the determining including determining, by the first device, whether the first broadcast message has a same originator address as the second broadcast message, and determining, by the first device, whether the second hop count is larger than the first hop count.

20 Claims, 7 Drawing Sheets

(51) Int. Cl.
*H04L 45/122* (2022.01)
*H04L 1/1607* (2023.01)

(58) Field of Classification Search
CPC ... H04W 40/248; H04W 84/18; H04W 24/02; H04W 24/04; H04W 28/02
See application file for complete search history.

(56) References Cited

U.S. PATENT DOCUMENTS

| | | | |
|---|---|---|---|
| 8,787,392 | B2 | 7/2014 | Vasseur et al. |
| 9,001,676 | B2 | 4/2015 | Hui et al. |
| 9,030,939 | B2 | 5/2015 | Hui et al. |
| 9,288,066 | B2 | 3/2016 | Hui et al. |
| 9,294,488 | B2 | 3/2016 | Vasseur et al. |
| 9,444,727 | B2 | 9/2016 | Vasseur et al. |
| 9,641,382 | B2 | 5/2017 | Hui et al. |
| 10,097,469 | B2 | 10/2018 | Hui et al. |
| 10,244,532 | B2 | 3/2019 | Taylor et al. |
| 10,833,890 | B2 | 11/2020 | Du et al. |
| 11,013,060 | B2 | 5/2021 | Lu et al. |
| 2012/0307624 | A1 | 12/2012 | Vasseur et al. |
| 2013/0250811 | A1 | 9/2013 | Vasseur et al. |
| 2014/0164552 | A1* | 6/2014 | Kim ............... H04L 67/568 709/214 |
| 2015/0200846 | A1 | 7/2015 | Hui et al. |
| 2015/0271062 | A1* | 9/2015 | Vijayasankar ......... H04B 3/542 370/252 |
| 2016/0104369 | A1* | 4/2016 | Szewczyk ............ H04L 12/283 340/506 |
| 2016/0212740 | A1 | 7/2016 | Hui et al. |
| 2018/0191478 | A1 | 7/2018 | Uhling et al. |
| 2021/0076296 | A1 | 3/2021 | Roter |
| 2021/0226666 | A1 | 7/2021 | Varesio et al. |
| 2021/0306030 | A1 | 9/2021 | Varesio et al. |

FOREIGN PATENT DOCUMENTS

| | | |
|---|---|---|
| KR | 20170114394 A | 10/2017 |
| WO | 2018151640 A1 | 8/2018 |
| WO | 2019201106 A1 | 10/2019 |

OTHER PUBLICATIONS

G3-PLC Alliance, "Narrowband OFDM PLC specifications for G3-PLC networks", G3-PLC Alliance Specifications (Mar. 2017), Recommendation ITU-T G.9903, Jun. 2021, 319 pages.

Mengi et al., "Update of the G3-PLC specifications to be reflected in a new revision of ITU-T recommendation G.9903;" ITU-T ; Study Period 2017-2020; Study Group 15; International Telecommunication Union, Geneva; CH, vol. 18/15, Mar. 2, 2021 (Mar. 2, 2021), pp. 1-23, XP044306039, Retrieved from the Internet: URL:https://www.itu.int/ifa/t/2017/sg15/docs/rgm/Q18-210308/C/T17-G15RGM-Q18-210308-C-0008.docx [retrieved on Mar. 2, 2021].

Musaddiq et al., "Energy-Aware Adaptive Trickle Timer Algorithm for RPL-based Routing in the Internet of Things," 2018 28th International Telecommunication Networks and Applications Conference (ITNAC), Nov. 21, 2018 (Nov. 21, 2018), pp. 1-6, XP033499891, DOI: 10.1109/ATNAC.2018.8615408 [retrieved on Jan. 16, 2019-].

International Telecommunication Union, Update of the G3-PLC Specifications To Be Reflected in a New Revision of ITU-T Recommendation G.9903, https://www.itu.int/ifa/t/2017/sg15/docs/rgm/Q18-210308/C/T17-SG15RGM-Q18-210308-C-0008, Mar. 12, 2021, 23 pages.

Zhang, Shujun, "Research and Implementation of Adaptive and Reliable Information Distribution Protocol in MANET Networks", Complete list of outstanding master's degree theses in China Document Database Information Technology Series, Aug. 15, 2018, 93 pages.

* cited by examiner

APPARATUS AND METHODS FOR MESH COMMUNICATION NETWORKS WITH BROADCAST MESSAGES

TECHNICAL FIELD

The present disclosure relates generally to communication networks, and, more particularly, to broadcast communication.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. PLC systems may be implemented differently depending upon local regulations, characteristics of local power grids, etc. Communications on PLC systems may use Orthogonal Frequency-Division Multiplexing (OFDM) signals that comply with a PRIME (Powerline Related Intelligent Metering Evolution), G3, IEEE P1901.2 or other Power Line Communication (PLC) standard, for example. The communication signal may be Frequency Shift Keying (FSK) or Phase Shift Keying (PSK) signals depending on the transmission method.

G3-PLC is a protocol that facilitates communication (e.g., on the electrical grid) using power line communication technology. The G3-PLC protocol is hosted by the standardization sector of the International Telecommunication Union (ITU, see itu.int), and it is supported by an international association, the G3-PLC Alliance (see g3-plc.com).

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a broadcast message mechanism for mesh networks. Some embodiments may use powerline communication (PLC) networks such as G3-PLC networks. Some embodiments may be used in other types of mesh networks.

In an embodiment, a mesh network may utilize a modified Trickle algorithm for transmitting broadcast messages (sometimes referred to as multicast messages). The modified Trickle algorithm improves the operation of the mesh network by improving the conventional Trickle algorithm. For example, the modified Trickle algorithm will ensure that the broadcast messages can be successfully delivered to all levels of a multi-level network at all practicable levels of attenuation between the levels of the network while also not overloading the transmission channel. The modified Trickle algorithm includes a mechanism to know the relative position of the node generating the received broadcast message inside the chain of repeating network nodes. For example, the modified Trickle algorithm takes into account the number of hops the received broadcast messages have had before being received by the current node. In a specific example, this modified Trickle algorithm changes the definition for a consistent broadcast frame (see discussion further below) to include the Hops Left field from the Mesh Header in addition to the Broadcast Sequence Number and Originator Address. In some embodiments of the modified Trickle algorithm, a broadcast frame will be considered a consistent frame if it has the same the Broadcast Sequence Number, the same Originator Address, and it has a Hops Left value smaller than the broadcast message that initiated the current Trickle algorithm instance. In some embodiments of the modified Trickle algorithm, other Mesh Header fields, including the Hops Left field, will be considered to determine consistent frames. This allows the nodes at a first network level to not increment the counter (e.g., to ignore the repeated messages) for repetitions of the broadcast message received from the previous network level. Further, this allows the nodes at the first network level to only increment the counter the repeated broadcast messages that it receives from the first network level or subsequent network levels. Therefore, rather than only a single node from the first network level repeating the broadcast message to a subsequent network level, the modified Trickle algorithm will have multiple nodes repeating the broadcast message.

Although the disclosed architecture can be applied to virtually any mesh network, the disclosed embodiments utilize G3-PLC protocol-based PLC networks for purposes of illustration.

Figure 1:
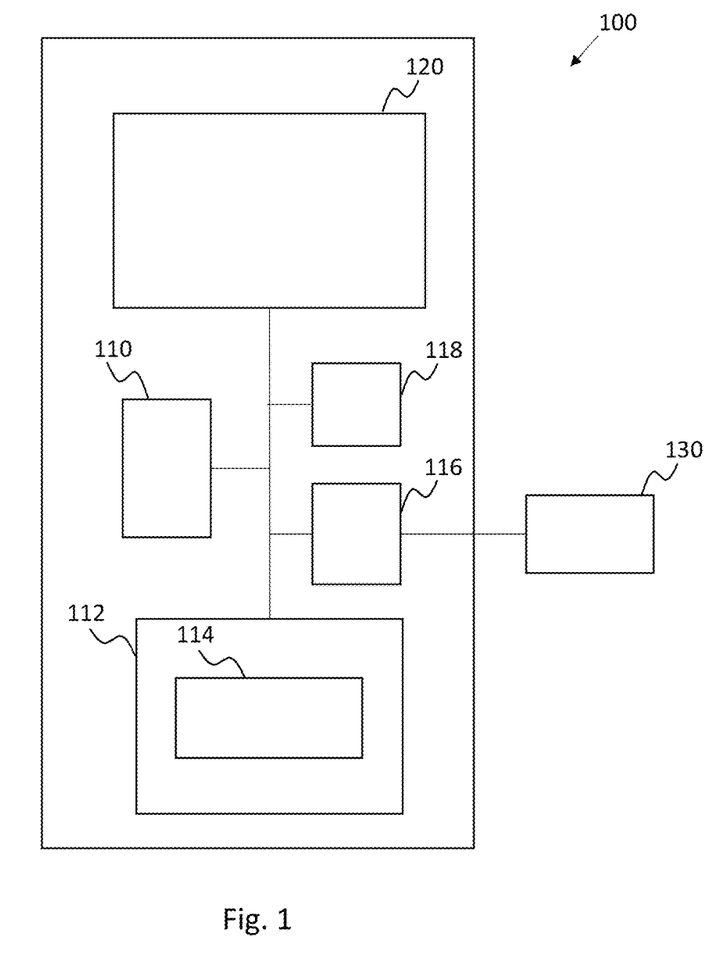
FIG. 1 shows an illustrative computing device in accordance with some embodiments.

FIG. 1 shows an illustrative computing device 100 in accordance with some embodiments. For example, the computing device 100 is, or is incorporated into, an electronic system, such as a computer, electronics control box or display, communications equipment (including transmitters), or any other type of electronic system arranged to generate and/or receive signals.

In some embodiments, the computing device 100 comprises an implementation of control logic such as a central processing unit 110 (CPU), a storage 112 (e.g., random access memory (RAM)) and a power supply 118. The CPU 110 can be, for example, a CISC-type (Complex Instruction Set Computer) CPU, RISC-type CPU (Reduced Instruction Set Computer), MCU-type (Microcontroller Unit), or a digital signal processor (DSP). The storage 112 (which can be memory such as on-processor cache, off-processor cache, RAM, flash memory, data registers, flip-flops, disk storage, and the like) stores one or more software applications 114 (e.g., embedded applications) that, when executed by the CPU 110, perform any suitable function associated with the computing device 100.

The CPU 110 comprises memory and logic that store information frequently accessed (e.g., written to and/or read from) from the storage 112. In some embodiments, the computing device 100 is controlled by a user using a UI (user interface), which provides output to and receives input from the user during the execution the software application 114. The output is provided using a display, indicator lights, a speaker, vibrations, the like, or a combination thereof. The input is received using audio and/or video inputs (using, for example, voice or image recognition), and electrical and/or mechanical devices such as keypads, switches, proximity detectors, gyros, accelerometers, the like, or a combination thereof. The CPU 110 is coupled to I/O (Input-Output) port 116, which provides an interface that is configured to receive input from (and/or provide output to) networked devices 130. The networked devices 130 can include any device (including control modules that are electronically paired with the computing device 100) capable of point-to-point and/or networked communications with the computing device 100. The computing device 100 is optionally coupled to peripherals and/or computing devices, including tangible, non-transitory media (such as flash memory) and/or cabled or wireless media. These and other input and output devices are selectively coupled to the computing device 100 by external devices using wireless or wired connections. The storage 112 is accessible, for example, by the networked devices 130.

The CPU 110 is coupled to I/O (Input-Output) port 116, which provides an interface that is configured to receive input from (and/or provide output to) peripherals and/or devices 130, including tangible (e.g., "non-transitory") media (such as flash memory) and/or wired or wireless media. These and other input and output devices are selectively coupled to the computing device 100 by external devices using wireless or cabled connections. The CPU 110, storage 112, and power supply 118 can be coupled to an external power supply (not shown) or coupled to a local power source (such as a battery, solar cell, alternator, inductive field, fuel cell, capacitor, and the like).

In some embodiments, the computing system 100 includes a smart meter 120 that is arranged to receive and transmit packet-based communications based on the OSI (open-systems interconnection) model (e.g., layered protocol stack). The smart meter 120 is arranged to provide power line communications (PLC) over which the packet-based communications are to be sent and received.

Figure 2:
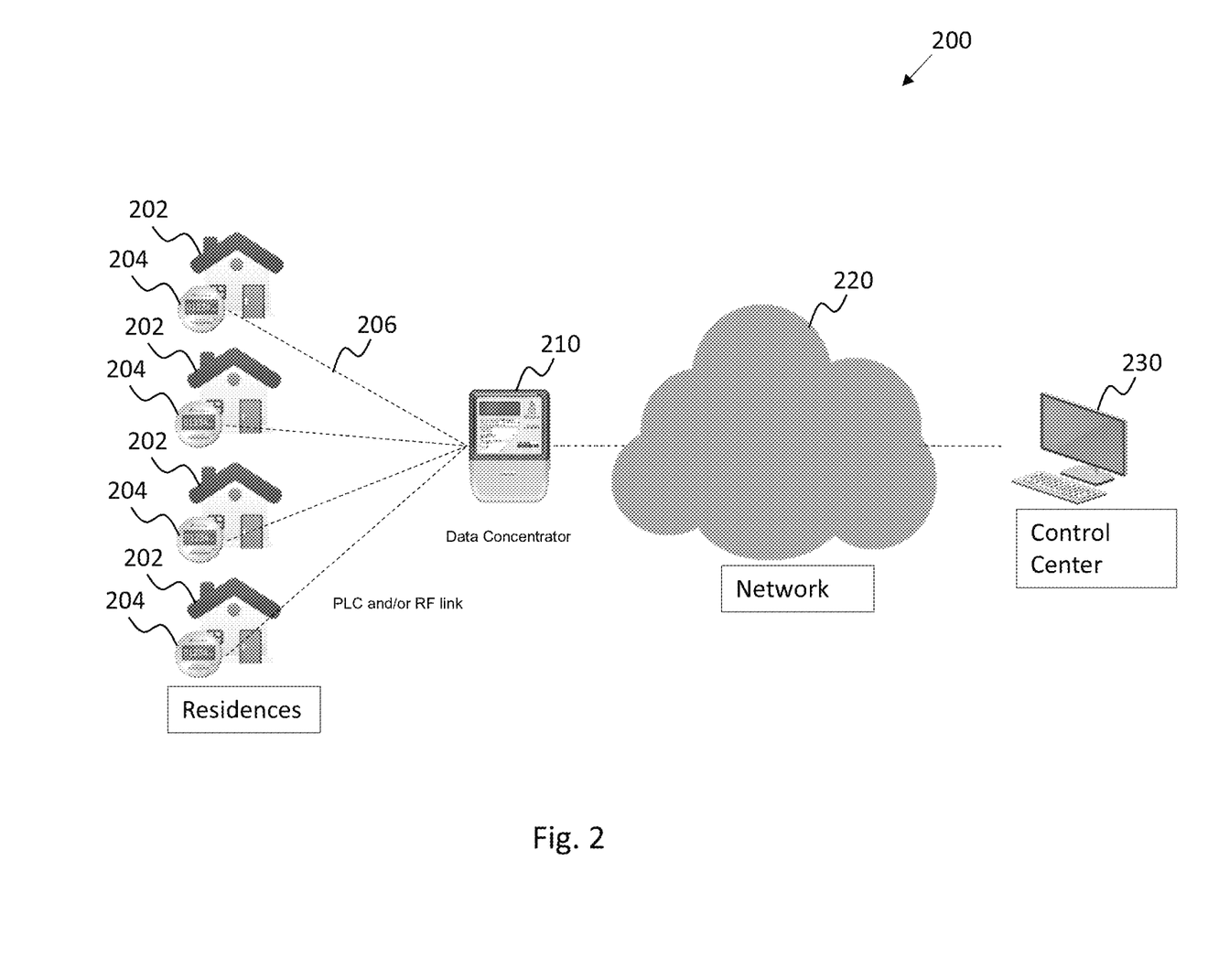
FIG. 2 illustrates a system architecture 200 in accordance with some embodiments.

FIG. 2 illustrates a system architecture 200 in accordance with some embodiments. In FIG. 2, residences 202 have meters 204 which are connected to power lines 206. The power lines 206 typically carry power from a power substation to the residences 202 and are connected to the residences by way of the meters 204. Although referred to as residences 202, premises 202 may include any type of building, facility or location where electric power is received and/or consumed. Each of the residences 202 include a breaker panel (not shown) that provides an interface between meter 204 and electrical wires (not shown) within residence 202. The electrical wires deliver power to various components such as outlets, switches, and other electric devices within residence 202.

The system architecture 200 illustrated in FIG. 2 may be used to deliver high-speed communications to residences 202. In some implementations, power line communications (PLC) modems or gateways (not shown) may be coupled to the power lines 206 at meters 204. PLC modems/gateways may be used to transmit and receive data signals over the power lines 206. Such data signals may be used to support metering and power delivery applications (e.g., smart grid applications), communication systems, high speed Internet, telephony, video conferencing, video delivery, the like, or a combination thereof. By transporting telecommunications and/or data signals over a power transmission network, there is no need to install new cabling to each residence 202. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an orthogonal frequency division multiplexing (OFDM) scheme or the like.

The PLC modems or gateways at residences 202 use the power grid to carry data signals to and from PLC data concentrator or router 210 without requiring additional wiring. The data concentrator 210 may be coupled to the meters 204 by a PLC connection over the power lines 206 or over a radio frequency (RF) connection. The PLC modems or gateways at residences 202 may support applications such as high-speed broadband Internet links, narrowband control applications, low bandwidth data collection applications, or the like. In a home environment, for example, modems or gateways may further enable home and building automation in heat and air conditioning, lighting, and security. Also, PLC modems or gateways may enable AC or DC charging of electric vehicles and other appliances.

Outside the premises, power line communication networks may provide street lighting control and remote power meter data collection.

One or more PLC data concentrators or routers 210 may be coupled to a control center 230 (e.g., a utility company) by way of a network 220. The network 220 may include, for example, an IP-based network, the Internet, a cellular network, a WiFi network, or the like. As such, control center 230 may be configured to collect power consumption and other types of relevant information from residences 202 through concentrator(s) 210. Additionally, the control center 230 may be configured to implement smart grid policies and other regulatory or commercial rules by communicating such rules to each of the residences 202 through the concentrator(s) 210 and meters 204.

Figure 3:
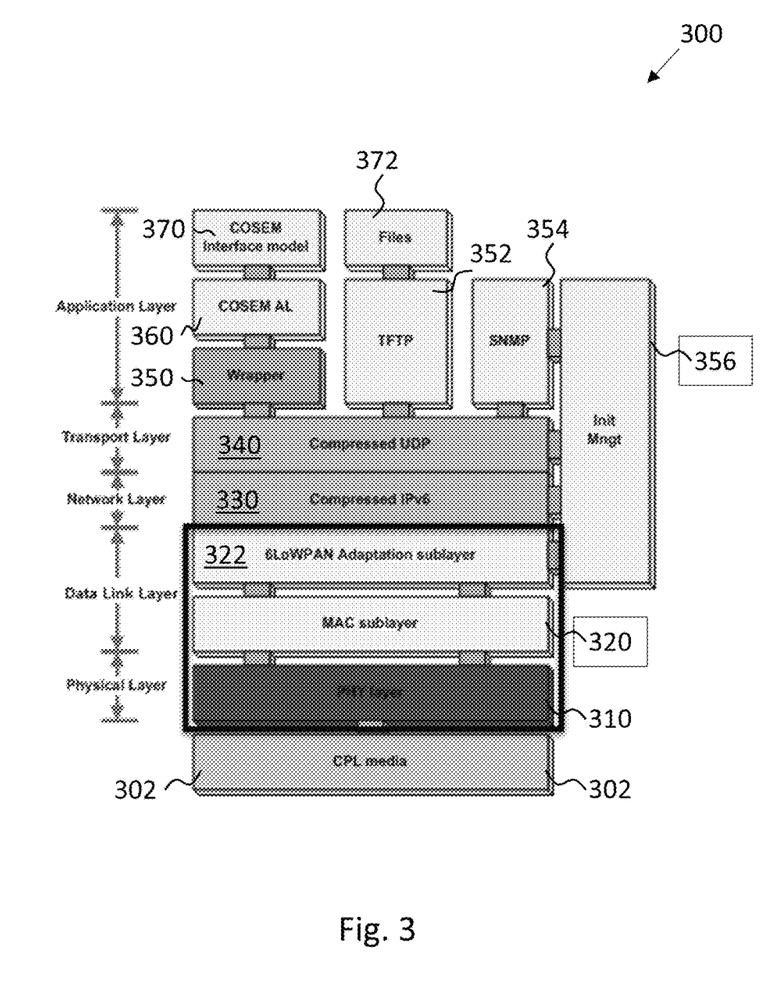
FIG. 3 is a block diagram illustrating a network architecture in accordance with some embodiments.

FIG. 3 is a block diagram illustrating a network architecture in accordance with some embodiments. Although the disclosed architecture can be applied to virtually any mesh network, the G3-PLC protocol-based PLC network is used herein for purposes of illustration. Generally described, the G3-PLC standard is directed towards power line communications.

The network stack 300 is a network stack organized in accordance with a G3-PLC protocol stack. The network stack 300 is illustrated as having five layers: a physical layer, a data link layer, a network layer, a transport layer, and an application layer. The G3-PLC protocol generally covers the physical layer and the data link layer. The physical layer includes physical layer (PHY) 310 that is coupled to a communication medium via coupler (CPL) 302. The data link layer includes a MAC (media access control) sublayer 320 and a 6LoWPAN (IPv6 over low power wireless personal area networks) adaptation sublayer 322. The network layer includes the compressed IPv6 (Internet protocol version six) layer 330. The transport layer includes the UDP (user datagram protocol) layer 340. The application layer includes the wrapper 350, the COSEM (companion specification for energy metering) application layer 360, the COSEM interface model 370, the TFTP (trivial file transfer protocol) 352, the SNMP (simple network time protocol) 354, and files 372. The initialization manager (INIT MNGT) 356 is operable for initializing the logical states of the various layers and sublayers.

The G3-PLC Adaptation sublayer is part of data link layer and is based on 6LoWPAN (IETF RFC 4944). Its role is to accommodate IPv6 layer for the use on top of IEEE 802.15.4. It is responsible for various features including:

The fragmentation of IPv6 packets: this is required to accommodate both MAC and IPv6 constraints on Maximum Transfer Unit (MTU) values (IPv6 MTU is 1280 bytes, G3-PLC MAC MTU is 400 bytes).

The compression of IPv6 and UDP headers: the uncompressed IPv6 and UDP headers are 48 bytes long. The Adaptation layer removes the implicit and redundant information to reduce it down to 2 bytes.

The routing of G3-PLC packets: this feature allows to relay the frames from devices to devices in order to allow a communication between devices that are not neighbors. The discovering of the routes is performed thanks to LOADng protocol, which is defined in ITU-T G.9903 Annex D.

The propagation of multicast frames.

The bootstrapping: it covers the discovery and the authentication of devices willing to join the G3-PLC network. An authentication is performed using EAP-PSK protocol (defined in IETF RFC 4764), relying on a unique-per-device PSK (Pre-Shared Key) which allows to authenticate the joining device and create a protected channel in which the group key (used at MAC sublayer for ciphering) is provided to the device.

Figure 4:
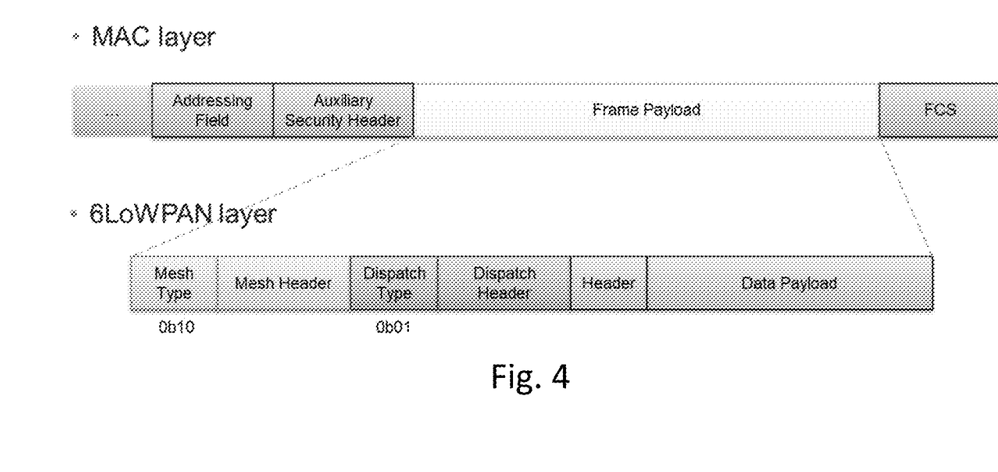
FIG. 4 illustrates an example of a header stack for 6LoWPAN data transported over a G3-PLC MAC layer in accordance with some embodiments.

FIG. 4 illustrates an example of a header stack for 6LoWPAN data transported over a G3-PLC MAC layer in accordance with some embodiments. In line with the OSI model principles, the 6LoWPAN data is prefixed by an encapsulation header. In the example illustrated in FIG. 4, the 6LoWPAN layer has a mesh header and a dispatch header although more or less headers are possible.

Figure 5:
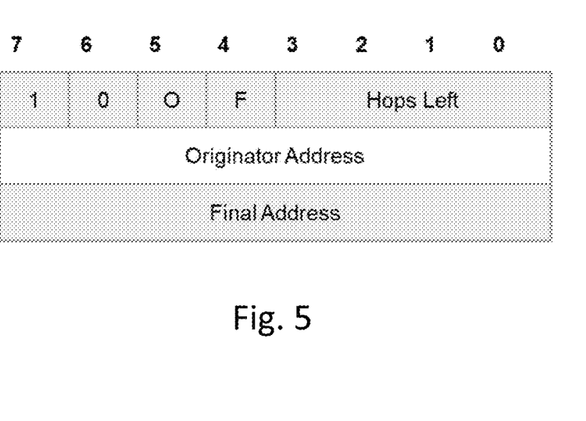
FIG. 5 illustrates an example of a mesh header used to forward packets of multiple hops inside a G3-PLC network in accordance with some embodiments.

FIG. 5 illustrates an example of a mesh header used to forward packets of multiple hops inside a G3-PLC network in accordance with some embodiments. In some embodiments, the mesh address header includes three fields: Hops Left, Originator Address and Final Address. The Hops Left field is used to limit the number of hops for forwarding a data packet which can avoid propagating the data packet in endless loops. The Hops Left field is initialized at a value X and is decremented at each hop. Once the count reaches zero the data packet is not further propagated. The Originator Address and Final Address fields are the IP end points for the data packet. Both the Originator Address and the Final Address fields IEEE 802.15.4 short addresses.

In mesh communication networks, and more specifically in G3-PLC networks, broadcast transmission is used for route establishment and for data distribution based on the 6LoWPAN broadcast mechanism.

Figure 6:
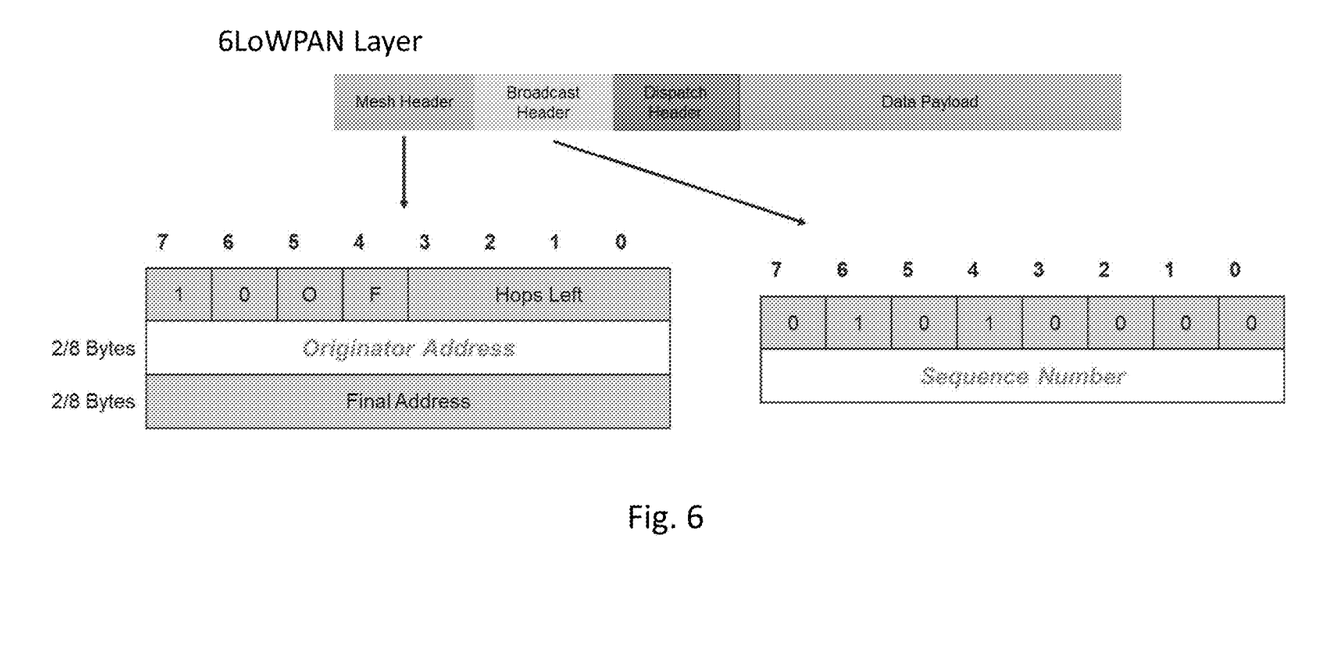
FIG. 6 illustrates another an example of a header stack including a broadcast header for 6LoWPAN data transported over a G3-PLC MAC layer in accordance with some embodiments.

FIG. 6 illustrates another an example of a header stack including a broadcast header for 6LoWPAN data transported over a G3-PLC MAC layer in accordance with some embodiments. This example includes a Mesh Header and a Broadcast Header and FIG. 6 illustrates the information in each of the Mesh Header and the Broadcast Header. In conventional G3-PLC networks, the broadcast transmissions were based on a flooding mechanism. Using the information in the Mesh and Broadcast Headers (e.g., Originator Address and Sequence Number), it is possible to uniquely identify frames belonging to a same flooding event.

A Broadcast Log Table holds information about all previously received Broadcast frames, and combining the Originator Address and Sequence Number carried in the headers illustrated in FIG. 6, it ensures that each node in the network will trigger a retransmission exactly once for a given flooding event.

The conventional flooding mechanism provides a high level of redundancy as all nodes in a network contribute to data propagation during the flooding event. While this high level of redundancy is beneficial in theory, in reality, it leads to issues caused by a limited resource of transmission channel availability. These issues are especially problematic in dense networks (densely populated urban areas with hundreds of nodes connected to the same network) and may potentially lead to temporary unavailability of the network.

To avoid overloading the shared transmission channel, the redundancy provided by the broadcast mechanism should be controlled, e.g., only provide redundancy to the extent needed to propagate the information through the entire network. In an attempt to achieve this goal, concepts of "The Trickle Algorithm" defined in IETF RFC 6206 has been considered to replace the conventional broadcast flooding mechanism.

Figure 7:
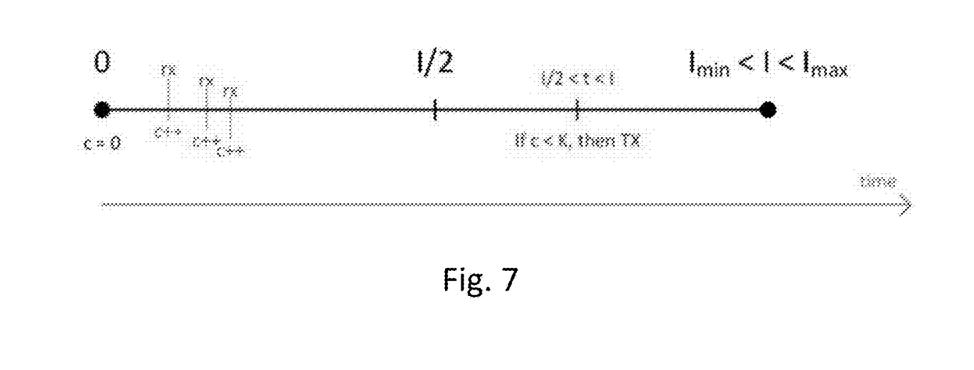
FIG. 7 illustrates a Trickle mechanism in accordance with some embodiments.

As illustrated in FIG. 7 and discussed below, a fundamental concept of Trickle is to consider retransmissions of data frames if the redundancy in the network is not sufficient. For the Trickle algorithm, the measurements of redundancy are based on a count of received frames of a same flooding event in a period of time (i.e., consistent frames). If a sufficient number of retransmissions of a flooding event have already been received from other nodes at a same network level, a given node will suppress its own retransmission. Each node on the network may have a separate instance of the Trickle algorithm running for each unique broadcast frame (same Broadcast Sequence Number and Originator Address) received by that node. In some embodiments, a node may have many instances of the Trickle algorithm running concurrently.

FIG. 7 illustrates a representation of parameters and the Trickle algorithm. Below is description of the Trickle algorithm for broadcast propagation when a broadcast frame is received:

IF the received broadcast frame is consistent (e.g., same Broadcast Sequence Number and Originator Address) with the broadcast frame that generated the current Trickle instance
   Increase the counter c by 1.
   Discard the broadcast frame.
ELSE
   Create entry with (Source Address, Broadcast Sequence Number) in the broadcast log table.
   Set the counter c to 0.
   Choose an interval I between $I_{min}$ and $I_{max}$. The parameter $I_{min}$ determines the minimum interval length. The parameter $I_{max}$ determines the maximum interval length and may result from a multiplication of $I_{min}$ by a predetermined factor. The node is in listening (or reception) mode for the first half (I/2) of the interval I.
   Choose a duration t less than I and between I/2 and I.
   Wait for the duration t to end.
   IF ($c<K_i$)–$K_i$ is a redundancy constant or redundancy threshold.
     Trigger the broadcast frame transmission.
   ELSE
     Discard the broadcast frame.

Figure 8:
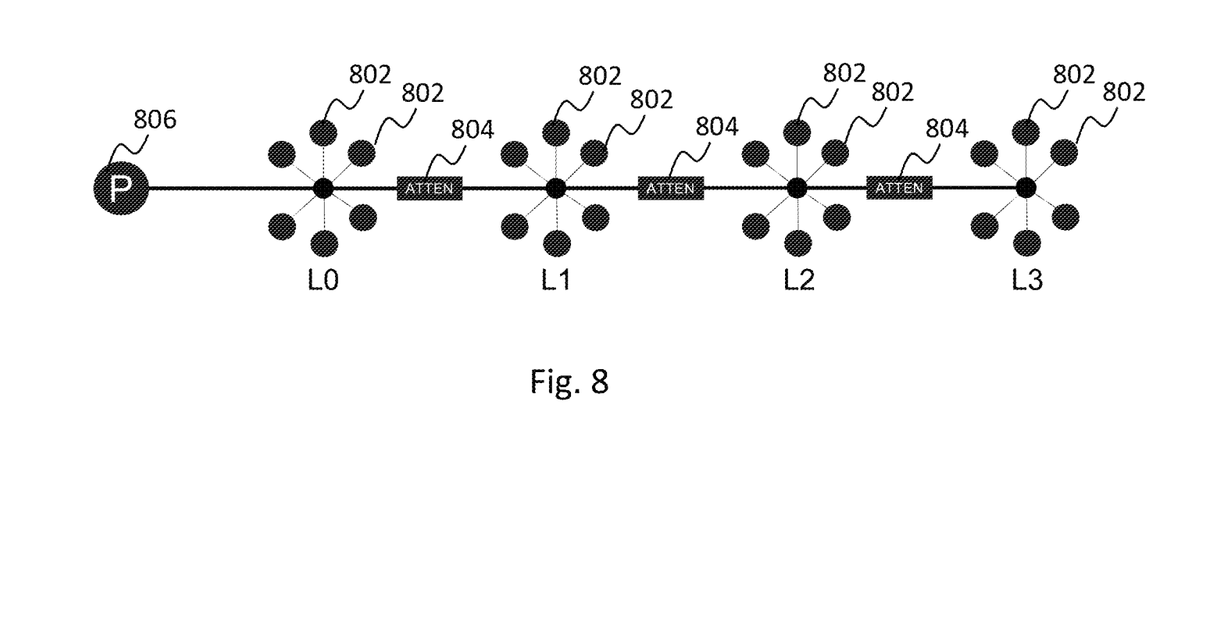
FIG. 8 illustrates an example of a multi-level network in accordance with some embodiments.

FIG. 8 illustrates an example of a multi-level network where G3-PLC may be used, such as, clusters of network nodes 802 representing each network level (L0-L4) and each cluster (network level (L0-L4)) is separated by some attenuation 804. As an example, each network level (L0-L4) (sometimes referred to as clusters L0-L4) could represent a neighborhood of residences and each network node 802 could be a smart meter at one of the residences. This multi-level network includes a message originator 806 which could be, for example, a PAN coordinator, data concentrator, or the like. In these types of networks where the network nodes are distributed as clusters, the Trickle algorithm performance degrades with the increase of the attenuation among the clusters. The degraded performance results in an increased number of broadcast messages which are not delivered to the entire network, with the clusters which are more distant from the originator, suffering the highest message loss.

As an example, the attenuation 804 is a value that only allows a message to traverse a single attenuation 804 but not more than one. Thus, a message can travel from the originator 806 to cluster L0 but not from the originator 806 to cluster L1. In this example, the nodes 802 in cluster L1 do not receive the broadcast message directly from the originator 806. Thus, the nodes 802 in cluster L1 will trigger their Trickle algorithm at the reception of the first message occurrence from cluster L0. These same nodes will also increment their counter c for the K−1 repeated messages originated in the cluster L0 assuming they receive them in the reception half of L1's Trickle interval.

This means that when the L1's nodes 802 Trickle transmission window starts (t>I/2), these nodes 802 already incremented their counter c to equal K−1 based on the messages received from cluster L0. Therefore, if K has the same value throughout the network levels L0-L4, only one of the L1 nodes will repeat the message, which reduces the probability that the message is well received by nodes in L2.

The inventors recognized these issues with the conventional Trickle algorithm and have developed an implementation that will improve the operation of the network by not overloading the transmission channel while also ensuring that broadcast messages can be successfully delivered to all levels of a multi-level network regardless of the attenuation levels between the levels of the network. The inventors' implementation includes a mechanism to know the relative position inside the chain of repeating nodes 802 of the node 802 generating the received broadcast message. This modified Trickle algorithm changes the definition for a consistent broadcast frame (see discussion above) to include the Hops Left field from the Mesh Header in addition to the Broadcast Sequence Number and Originator Address. In some embodiments of the modified Trickle algorithm, a broadcast frame will be considered a consistent frame if it has the same the Broadcast Sequence Number, the same Originator Address, and it has a Hops Left value smaller (i.e., frame has had more hops) than the broadcast message that initiated the current Trickle algorithm instance. This allows the nodes 802 at cluster L1 to not increment the counter c (e.g., to ignore the repeated messages) for repetitions of the broadcast message received from cluster L0. Further, this allows the nodes 802 at cluster L1 to only increment the counter c for K repeated broadcast messages that it receives from cluster L1 or later clusters. Therefore, rather than only a single node 802 from cluster L1 repeating the broadcast message to L2, the modified Trickle algorithm will have K nodes 802 repeating the broadcast message to the nodes 802 in cluster L1 and subsequent clusters.

In some other embodiments of the modified Trickle algorithm, the node 802 keeps track of the smallest Hops Left value received for a given Trickle Instance. When a new broadcast frame is received and the Hops Left value is smaller than the one stored in memory, the counter c is reset. Thus, only the broadcast frames with the smallest Hops Left value are considered consistent broadcast frames. Similar to the previous embodiment, this modified Trickle Algorithm will have K nodes 802 repeating the broadcast message to the nodes in subsequent network levels/clusters. A common aspect between those different techniques is the use of the "Mesh Header" fields (e.g., Hops Left) to improve Trickle performance.

As explained above, the Hops Left field is initialized by the originator at a certain value X, which is the maximum number of times the message can be repeated inside the network before it expires (if the final destination has not been reached). Each repeating node will generate a message with a Hops Left value decremented by 1 with respect to the received Hops Left value and, a message with Hops Left value equal to zero shall not be further propagated.

By using the Hops Left in determination of a consistent broadcast frame, it is possible to locate the relative position of the sender, inside the repetition chain, directly from the received message. In the example discussed above for FIG. 8, if the originator 806 sends a message with Hops Left value equal to X, the nodes in L0 will propagate it with the value of X−1, while nodes in L1, as they receive the message from nodes in L0, will propagate the message with Hops Left value equal to X−2, and so on.

In some embodiments to enable the consideration of the Hops Left field in Mesh Header, the definition of consistent information in G3-PLC specs could change as shown below.

"Considering the same instance of the Trickle algorithm, a consistent transmission consists in a copy of the same broadcast frame (i.e., a broadcast frames with same Broadcast Sequence Number and Originator Address) with Hops Left field in Mesh Header smaller than the one which generated the Trickle instance."

Figure 9:
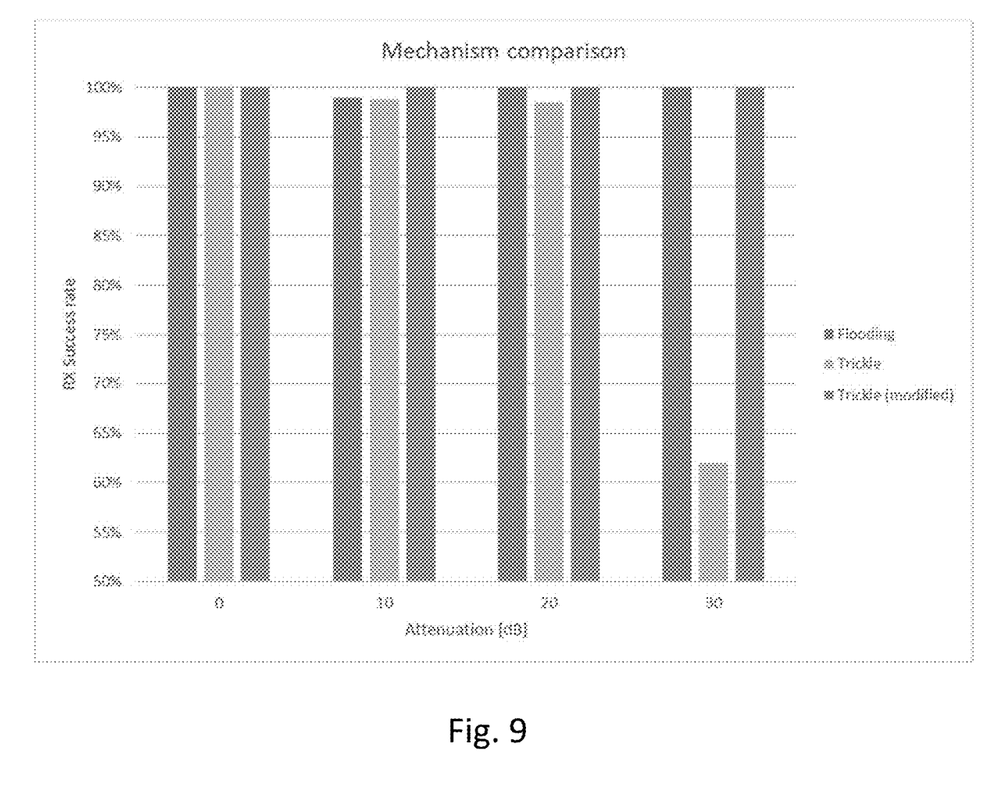
FIG. 9 illustrates experimental results of testing the modified Trickle algorithm in accordance with some embodiments.

FIG. 9 illustrates experimental results of testing the modified Trickle algorithm. The experiment was conducted using a modified G3-PLC Protocol implementation on ST8500 PLC modem. Such implementation has been tested in a laboratory simulating Smart Meters and a Data Concentrator using evaluation kits. FIG. 9 illustrates the receiving success rates for the nodes at four different attenuations (0, 10, 20, and 30 dB) between the network clusters. In FIG. 9, for each of the attenuation levels, the receiving success rates are shown in the following order from left to right: Flooding, Trickle, and modified Trickle.

The flooding method was included in this comparison as a reference point and has a rate of received packets that is always above 95% but runs the risk of network congestion. The conventional Trickle algorithm as works well at low attenuations between the several clusters, but fails at higher attenuations.

The modified Trickle algorithm worked perfectly with no messages lost at all the attenuations, while keeping the level of congestion in the network under control, by reducing the overall number of retransmissions per each message.

Embodiments may achieve advantages. The present disclosure includes a modified Trickle algorithm for transmitting broadcast messages. The modified Trickle algorithm will ensure that the broadcast messages can be successfully delivered to all levels of a multi-level network at all practicable levels of attenuation between the levels of the network while also not overloading the transmission channel. The modified Trickle algorithm includes a mechanism to know the relative position of the node generating the received broadcast message inside the chain of repeating network nodes. For example, when determining whether a received broadcast message is a consistent broadcast message, the modified Trickle algorithm takes into account the number of hops the received broadcast messages have had before being received by the current node. In a specific example, this modified Trickle algorithm changes the definition for a consistent broadcast frame to include the Hops Left field from the Mesh Header in addition to the Broadcast Sequence Number and Originator Address. In the modified Trickle algorithm, a broadcast frame will be considered a consistent frame if it has the same the Broadcast Sequence Number, the same Originator Address, and it has a Hops Left value smaller than the broadcast message that initiated the current Trickle algorithm instance. This allows the nodes at a first network level to not increment the counter (e.g., to ignore the repeated messages) for repetitions of the broadcast message received from the previous network level. Further, this allows the nodes at the first network level to only increment the counter the repeated broadcast messages that it receives from the first network level or subsequent network levels. Therefore, rather than only a single node from the first network level repeating the broadcast message to a subsequent network level, the modified Trickle algorithm will have multiple nodes repeating the broadcast message.

Example embodiments of the invention are summarized here. Other embodiments can also be understood from the entirety of the specification as well as the claims filed herein.

Example 1. A method includes receiving, by a first device via a mesh communication network, a first broadcast message over a first communication channel, the first broadcast message having a first hop count; receiving, by the first device via the mesh communication network, a second broadcast message over the first communication channel; and determining, by the first device, whether the second broadcast message is a consistent broadcast message as the first broadcast message, the determining including: determining, by the first device, whether the first broadcast message has a same originator address as the second broadcast message; and determining, by the first device, whether the second hop count is larger than the first hop count.

Example 2. The method of example 1, the first communication channel being a power line communication channel.

Example 3. The method of one of examples 1 or 2, where determining, by the first device, if the second broadcast message is a consistent broadcast message as the first broadcast message, further includes: determining, by the first device, if the first broadcast message has a same broadcast sequence number as the second broadcast message.

Example 4. The method of one of examples 1 to 3 further including: retransmitting the first broadcast message over a second communication channel to a second device.

Example 5. The method of one of examples 1 to 4, where the first device is a power meter connected to a powerline, and where the first communication channel is a G3-PLC (powerline communication) channel.

Example 6. The method of one of examples 1 to 5, where the mesh communication network includes multiple network levels, the first device being in a first network level, and where the first broadcast message originates from a different network level than the first network level.

Example 7. A method of managing broadcast messages at a first node of a mesh communication network includes receiving a first broadcast message at the first node; counting a first predetermined time period; determining a number of consistent broadcast messages received at the first node during the first predetermined time period, where determining the number of consistent broadcast messages is based on originator addresses for the broadcast messages, sequence numbers for the broadcast messages, and hop counts for the broadcast messages; and retransmitting the broadcast message from the first node, in response to determining that the first predetermined period has been reached and less than a predetermined threshold of the consistent broadcast messages have been counted during the first predetermined time period.

Example 8. The method of example 7, where the mesh communication network is a powerline network.

Example 9. The method of one of examples 7 or 8, where the predetermined threshold is three.

Example 10. The method of one of examples 7 to 9, where determining the number of consistent broadcast messages received at the first node during the first predetermined time period further includes: receiving a second broadcast message at the first node; and determining the second broadcast message is a consistent broadcast message with the first broadcast message in response to the originator addresses and sequence numbers being the same and in response to the hop count for the second broadcast message being larger than the first broadcast message.

Example 11. The method of one of examples 7 to 10, where determining the number of consistent broadcast messages received at the first node during the first predetermined time period further includes: receiving a second broadcast message at the first node; and determining the second broadcast message is not a consistent broadcast message with the first broadcast message in response to the originator addresses and sequence numbers being the same and in response to the hop count for the second broadcast message being the same or smaller than the first broadcast message.

Example 12. The method of one of examples 7 to 11, where the first node is a power meter connected to a powerline, and where the mesh communication network is a G3-PLC (powerline communication) network.

Example 13. The method of one of examples 7 to 12, where the information for the originator addresses, sequence numbers, and hop counts for the broadcast messages are contained in headers of 6LoWPAN (IPv6 over low power wireless personal area network) data.

Example 14. The method of one of examples 7 to 13, where the mesh communication network includes multiple network levels, the first node being in a first network level, and where the first broadcast message originates from a different network level than the first network level.

Example 15. An apparatus for managing broadcast messages at a first node of a mesh communication network includes a transceiver for transmitting and receiving broadcast messages at the first node; a timer for counting a first predetermined time period; a counter for determining a number of consistent broadcast messages received at the first node during the first predetermined time period, where determining the number of consistent broadcast messages is based on originator addresses for the broadcast messages, sequence numbers for the broadcast messages, and hop counts for the broadcast messages; and a controller configured to retransmit a broadcast message from the first node, in response to determining that the first predetermined period has been reached and less than a predetermined threshold of the consistent broadcast messages have been counted during the first predetermined time period.

Example 16. The apparatus of example 15, where the mesh communication network is a powerline network.

Example 17. The apparatus of one of examples 15 or 16, where the first node is a power meter connected to a powerline, and where the mesh communication network is a G3-PLC (powerline communication) network.

Example 18. The apparatus of one of examples 15 to 17, where the information for the originator addresses, sequence numbers, and hop counts for the broadcast messages are contained in headers of 6LoWPAN (IPv6 over low power wireless personal area network) data.

Example 19. The apparatus of one of examples 15 to 18, where the mesh communication network includes multiple network levels, the first node being in a first network level, and where the first broadcast message originates from a different network level than the first network level.

Example 20. The apparatus of one of examples 15 to 19, where nodes at each of the multiple network levels each use a same value for the predetermined threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of managing broadcast messages at a first node of a mesh communication network, the method comprising:
   receiving a first broadcast message at the first node;
   counting a first predetermined time period;
   determining a number of consistent broadcast messages received at the first node during the first predetermined time period, wherein determining the number of consistent broadcast messages is based on originator addresses for the broadcast messages, sequence numbers for the broadcast messages, and hop counts for the broadcast messages; and
   retransmitting the broadcast message from the first node, in response to determining the first predetermined time period has been reached and less than a predetermined threshold of the consistent broadcast messages have been counted during the first predetermined time period.

2. The method of claim 1, wherein the mesh communication network is a powerline network.

3. The method of claim 1, wherein the predetermined threshold is three.

4. The method of claim 1, wherein determining the number of consistent broadcast messages received at the first node during the first predetermined time period further comprises:
   receiving a second broadcast message at the first node; and
   determining the second broadcast message is a consistent broadcast message with the first broadcast message in response to the originator addresses and sequence numbers being the same and in response to the hop count for the second broadcast message being larger than the first broadcast message.

5. The method of claim 1, wherein determining the number of consistent broadcast messages received at the first node during the first predetermined time period further comprises:
   receiving a second broadcast message at the first node; and
   determining the second broadcast message is not a consistent broadcast message with the first broadcast message in response to the originator addresses and sequence numbers being the same and in response to the hop count for the second broadcast message being the same or smaller than the first broadcast message.

6. The method of claim 1, wherein the first node is a power meter connected to a powerline, and wherein the mesh communication network is a G3-PLC (powerline communication) network.

7. The method of claim 6, wherein the information for the originator addresses, sequence numbers, and hop counts for the broadcast messages are contained in headers of 6LoW-PAN (IPv6 over low power wireless personal area network) data.

8. The method of claim 7, wherein the mesh communication network includes multiple network levels, the first node being in a first network level, and wherein the first broadcast message originates from a different network level than the first network level.

9. An apparatus for managing broadcast messages at a first node of a mesh communication network, the apparatus comprising:
   a transceiver for transmitting and receiving broadcast messages at the first node;
   a timer for counting a first predetermined time period;
   a counter for determining a number of consistent broadcast messages received at the first node during the first predetermined time period, wherein determining the number of consistent broadcast messages is based on originator addresses for the broadcast messages, sequence numbers for the broadcast messages, and hop counts for the broadcast messages; and
   a controller configured to retransmit a broadcast message from the first node, if the first predetermined time period has been reached and less than a predetermined threshold of the consistent broadcast messages have been counted during the first predetermined time period.

10. The apparatus of claim 9, wherein the mesh communication network is a powerline network.

11. The apparatus of claim 9, wherein the first node is a power meter connected to a powerline, and wherein the mesh communication network is a G3-PLC (powerline communication) network.

12. The apparatus of claim 11, wherein the information for the originator addresses, sequence numbers, and hop counts for the broadcast messages are contained in headers of 6LoWPAN (IPv6 over low power wireless personal area network) data.

13. The apparatus of claim 9, wherein the mesh communication network includes multiple network levels, the first node being in a first network level, and wherein at least one of the received broadcast messages originates from a different network level than the first network level.

14. The apparatus of claim 13, wherein nodes at each of the multiple network levels each use a same value for the predetermined threshold.

15. A method of managing broadcast messages at a first node of a multi-level mesh communication network, the method comprising:
   receiving a first broadcast message at the first node in a first network level, the first broadcast message originating from a second network level different than the first network level;
   counting a first predetermined time period, wherein the first predetermined time period is based on a minimum interval length and a maximum interval length;
   determining a number of consistent broadcast messages received at the first node during the first predetermined time period, wherein determining the number of consistent broadcast messages is based on originator addresses for the broadcast messages, sequence numbers for the broadcast messages, and hop counts for the broadcast messages; and
   retransmitting the broadcast message from the first node, in response to determining the first predetermined time period has been reached and less than a predetermined threshold of consistent broadcast messages have been counted during the first predetermined time period.

16. The method of claim 15, wherein the multi-level mesh communication network is a G3-PLC (powerline communication) network, and wherein the first node is a power meter connected to a powerline.

17. The method of claim 15, wherein determining the number of consistent broadcast messages received at the first node during the first predetermined time period further comprises:
   receiving a second broadcast message at the first node;
   determining the second broadcast message is a consistent broadcast message with the first broadcast message in response to the originator address and sequence number of the second broadcast message being the same as the originator address and the sequence number of the first broadcast message and in response to the hop count of the second broadcast message being larger than the hop count of the first broadcast message;
   incrementing a counter for the number of consistent broadcast messages;
   receiving a third broadcast message at the first node; and
   resetting the counter for the number of consistent broadcast messages in response to the hop count of the third broadcast message being smaller than the hop count of the second broadcast message.

18. The method of claim 17, wherein the information for the originator addresses, sequence numbers, and hop counts for the broadcast messages are contained in mesh headers and broadcast headers of 6LoWPAN (IPv6 over low power wireless personal area network) data.

19. The method of claim 15, further comprising:
   receiving a second broadcast message at the first node after retransmitting the first broadcast message;
   counting a second predetermined time period;
   determining a second number of consistent broadcast messages received at the first node during the second predetermined time period;
   retransmitting the second broadcast message from the first node, in response to determining the second predetermined time period has been reached and less than the predetermined threshold of consistent broadcast messages have been counted during the second predetermined time period; and
   discarding the second broadcast message, in response to determining the second predetermined time period has been reached and the predetermined threshold or more of consistent broadcast messages have been counted during the second predetermined time period.

20. The method of claim 15, further comprising:
   incrementing the hop count of the first broadcast message before retransmitting the first broadcast message from the first node.

* * * * *